Sept. 8, 1970
C. I. SEWARD ETAL
3,527,549
MOTOR PUMP SUSPENSION
Filed Aug. 29, 1968
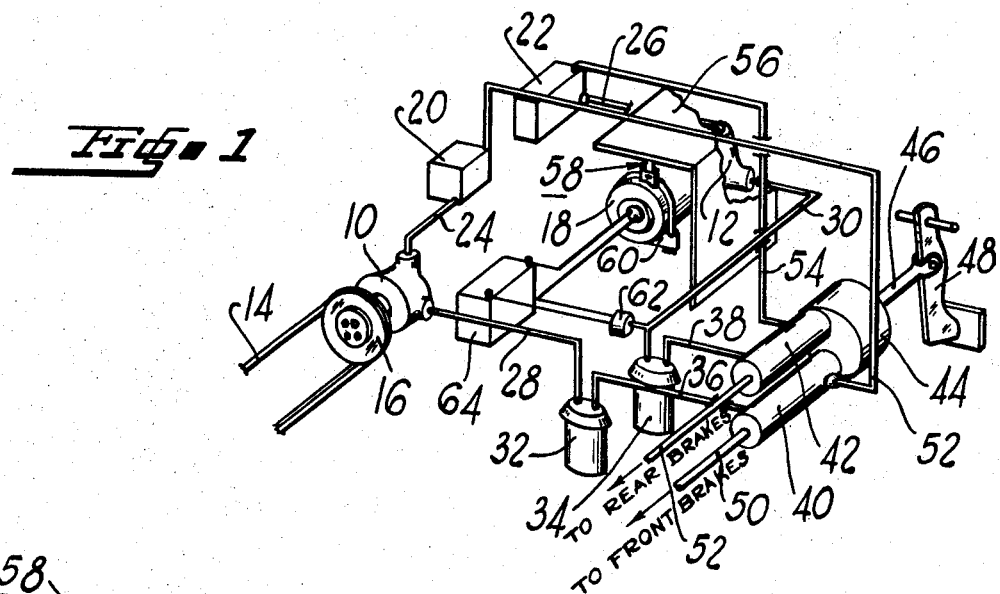
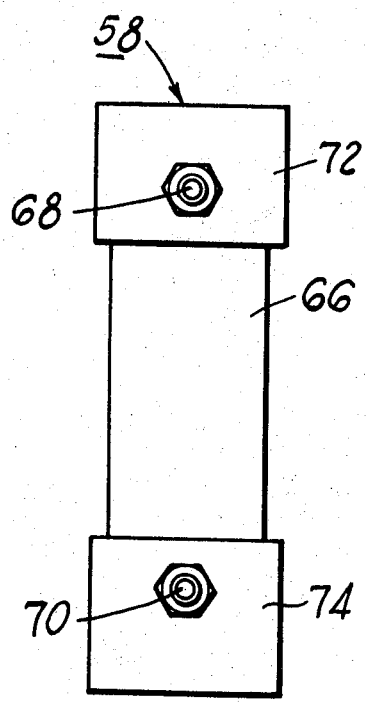
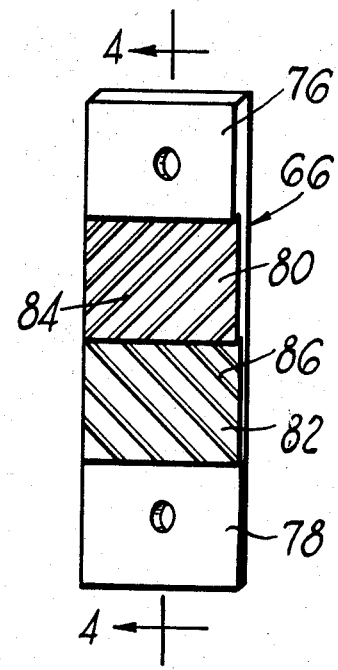
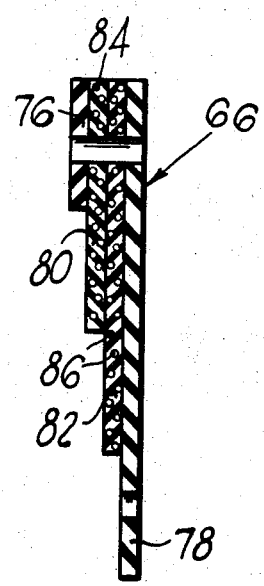
INVENTORS
CHARLES I. SEWARD
DEANE K. JENNEY
BY
Richard G. Geib
ATTORNEY › # United States Patent Office 3,527,549
Patented Sept. 8, 1970

3,527,549
MOTOR PUMP SUSPENSION
Charles I. Seward and Deane K. Jenney, South Bend, Ind., assignors to The Bendix Corporation, a corporation of Delaware
Filed Aug. 29, 1968, Ser. No. 756,244
Int. Cl. F04b *21/00;* F16f *15/00;* H02k *7/14*
U.S. Cl. 417—363                          2 Claims

ABSTRACT OF THE DISCLOSURE

A means to suspend a motor pump having at least two spaced points of attachment to the motor pump with flexible members thereat to absorb vibration and noise of operation.

SUMMARY

Prior art suspension means of a flexible nature to isolate engine vibrations are fairly well known. Most of these earlier devices comprise rubber or rubber laminated blocks which in and of themselves are rather inflexible. Their success, while being totally unacceptable in this system shown by the attached drawings, operate by damping by shear force resistance for the most part. In other words, the blocks are normally angularly arranged between the structures to be integrated so that vibratory forces cannot pass straight through the mount.

These prior art structures would not permit arcuate motion of the engine or similar article such as a motor-pump with respect to the fixed frame to which it is mounted about a center within the suspension means. It is a principal object of this invention to improve upon a suspension means whereby excitations of the suspended article are absorbed within the flexible suspension means without loading the frame elements in that the suspended article can only move about a center within the flexible suspension means.

A more detailed object is to utilize laminated flexible straps to hang a motor-pump means to a frame or fixed support such that vibrations and noises of the means is absorbed in the straps.

DRAWING DESCRIPTION

Further objects and advantages will become apparent from the following description of the drawings in which:

FIG. 1 is a schematic illustration of a fail-safe brake system having an electric motor and pump means suspended by flexible straps in accordance with this invention;

FIG. 2 is an end view of the strap according to this invention and its end fittings for attachment to the frame and motor pump means according to this invention;

FIG. 3 is an end view of the strap having portions cut away to show the four layers thereof in accordance with a preferred form of construction according to this invention; and FIG. 4 is a side view of the sectional strap of FIG. 3.

DETAILED DESCRIPTION

With regard now to FIG. 1 there is shown a full power hydraulic brake system of the fail-safe variety employing an engine driven pump 10 and an electric motor driven pump 12. As seen, a fan belt 14 is connected to a pulley 16 for driving the engine driven pump 10; whereas the electric motor driven pump 12 is attached to the rear end of an electric motor 18. Fluid supply for these pump means is provided by a pair of reservoirs 20 and 22 connected by supply pipes 24 and 26, respectively, to the appropriate inlet provisions for the pumps 10 and 12. The pumps 10 and 12 deliver pressurized hydraulic fluid via conduits 28 and 30 to a pair of accumulators 32 and 34, respectively. Conduits 36 and 38 connect accumulators 32 and 34 to appropriate inlet ports for brake control valves 40 and 42 having a common operator within housing 44 connected by a rod 46 to brake pedal 48. The brake valves 40 and 42 have conduits 50 and 52 connected to appropriate discharge port means for the valves 40 and 42 which are the fluid supply means for the front and rear brakes, respectively. In addition, the brake valves 40 and 42 are provided with appropriate return port means to which conduits 52 and 54 are connected leading back to the fluid reservoirs 20 and 22.

The engine driven pump 10 will be supported by a bracket to the vehicle engine in most installations visualized so far. As for the motor driven pump 12, the motor 18 is suspended from a frame or bracket 56 by a flexible strap assembly 58 connected to the motor by means of a clamp 60. It should be noted that the motor 18 with its pump 12 can be affixed within the vehicle at any desired location where the space permits.

The brake system shown in FIG. 1 is complete with the attachment of a pressure regulating valve 62 in the conduit 30 that is interposed between the electrical connection from the vehicle battery 64 and the pump motor 18. The function of this pressure responsive switch is to terminate the drive for the pump 12 whenever the accumulator 34 is charged to a predetermined level. The pump 10, on the other hand, is provided with pressure regulating means sensitive to the discharge pressure within the pump so as to terminate the inlet supply whenever accumulator 32 has reached an equally predetermined charge. It is desirable that the pressure regulation device within the pump 10 be such as to reduce the loading on the pulley 16 whenever the accumulator 32 has reached its predetermined charge so as to eliminate any horsepower drain on the vehicle's engine.

With more specific reference to the strap assembly 58 attention is directed to FIG. 2 to show a flexible strap 66 of rectangular form connected by bolts 68 and 70 to end fittings 72 and 74. A preferred construction of the flexible strap 66 would have it approximately 3/16 of an inch thick by 1½ inches wide and 3 inches long. In any event, the length should be such that the motor pump assembly will be able to move in an arcuate fashion about a center within the confines of the strap 66 between the end fittings 72 and 74.

With reference now to FIG. 3 the strap 66 is shown in more detail to comprise four layers with forward and aft facing layers 76 and 78 enclosing intermediate layers 80 and 82. The intermediate layers 80 and 82 comprised rubber integrated reinforcements, such as fibrous strangs 84 and 86, which run at a diagonal to the longitudinal axis of the strap 66. In fact, it has been found that an ideal pattern is to have the reinforcements 84 running at a diagonal to the axis of the straps 66 oppositely of the reinforcements 86 in the lay 82. It should be readily appreciated that the reinforcements may be Fiberglas or metallic filaments depending upon the loading of the requirements for the strap 66. In fabricating the intermediate layers 80 and 82 the reinforcements, such as the fibrous strands 84 and 86, are separated and surrounded in most cases by rubber or some similar flexible material such as polyurethane. Generally speaking, this rubber or polyurethane forms the solid facings 76 and 78 so as to provide in a homogeneous strap 66 upon curing the assembly of the various layers one to the other. The opposite diagonals for the reinforcements 84 and 86 have been found to reduce the amount of motion that is permitted to the pump 18 while at the same time permitting the absorption of vibratory excitations either because of the pumping of fluid with the pump 12 or the frame 56 vibration from cumulating into the vehicle frame whereby excessive noise is eliminated by the strap 66. In that the center point for the arcuate motion of the motor 18 and its pump 12 is within the length of the strap 66, frictional loading from the strap will not be apparent on the end fitting 72, as it would be in the more familiar prior art rubber or rubber laminated mounting blocks whereby the surface friction on the face of the blocks permits the transferral of noise and vibrations.

We claim:

1. A resilient suspension means for a pump and drive means which generates hydraulic pressure from a source of hydraulic fluid in a control system having a control valve for monitoring the supply and return of hydraulic pressure to an actuator, said resilient suspension means comprising a fore and aft laminated strap attached to said pump and drive means, a first layer of said laminated strap integrating separate noncontinuous reinforcement strands diagonally across the vertical axis of said strap, a second layer of said laminated strap integrating separate noncontinuous reinforcement strands diagonally across the vertical axis of said strap and substantially perpendicular to strands in said first layer, all said reinforcement strands are parallel to the frontal plane of said strap.

2. A resilient suspension means as recited in claim 1, wherein said straps are made from a rubber-like substance and said strands are made from a fibrous material, said suspension means further comprising:
a rubber coating over said laminated straps; and
end fitting means for attaching said straps.

References Cited

UNITED STATES PATENTS

| 917,188 | 4/1909 | Tirrill | 310—91 |
| 1,139,158 | 5/1915 | Boerries | 310—91 XR |
| 3,317,124 | 5/1967 | Morrill | 230—273 |

ROBERT M. WALKER, Primary Examiner

U.S. Cl. X.R.

248—18; 310—91; 417—1, 44, 411